United States Patent [19]

Shimizu et al.

[11] Patent Number: 4,975,853
[45] Date of Patent: Dec. 4, 1990

[54] IMAGE PROCESSING SYSTEM HAVING POLYGONAL LINE PROCESSING OF PIXEL LINE DATA

[75] Inventors: Nobuyuki Shimizu, Hatsukaichi; Yutaka Tanaka, Yokohama, both of Japan

[73] Assignee: Hitachi Software Engineering Co., Ltd., Yokohama, Japan

[21] Appl. No.: 272,947

[22] Filed: Nov. 18, 1988

[30] Foreign Application Priority Data

Nov. 20, 1987 [JP] Japan ................................. 62-293739
Nov. 20, 1987 [JP] Japan ................................. 62-293740

[51] Int. Cl.$^5$ ............................................. G06F 15/70
[52] U.S. Cl. .................. 364/474.24; 382/22; 382/24
[58] Field of Search .................... 364/518, 474.24; 382/16, 21, 22, 24, 26, 56

[56] References Cited

U.S. PATENT DOCUMENTS 4,524,454 6/1985 Ejiri ........................................ 382/21
4,566,124 1/1986 Yamamoto et al. .................... 382/21
4,748,675 5/1988 Suzuki et al. .......................... 382/21
4,777,651 10/1988 McCann et al. ....................... 382/21
4,783,829 11/1988 Miyakawa et al. ................ 382/56 X Primary Examiner—Dale M. Shaw
Assistant Examiner—Mark K. Zimmerman
Attorney, Agent, or Firm—Fay, Sharpe, Beall, Fagan, Minnich & McKee

[57] ABSTRACT

An image processing device which is designed to trace a pixel line in a pixel line data and provide a polygonal line data. The image processing device is provided with a pixel line tracing means for forming a tracing dot data by tracing one pixel after another in the pixel line, a tracing direction selecting means for selecting a direction substantially coinciding in a branch direction with the pixel line tracing direction on the basis of the tracing dot data obtained so far by judging the branch direction nearby a pixel at the branch point when the pixel line tracing means detects the pixel at the branch point by tracing, and a polygonal line processing unit for forming a polygonal line data by selecting a pixel line tracing direction by the tracing direction means, causing the pixel line tracing means to continue the tracing of the pixel line in substantially the same direction over the branch point, and forming a tracing dot line. The image processing device permits an effective processing of polygonal lines in the image processing.

3 Claims, 14 Drawing Sheets

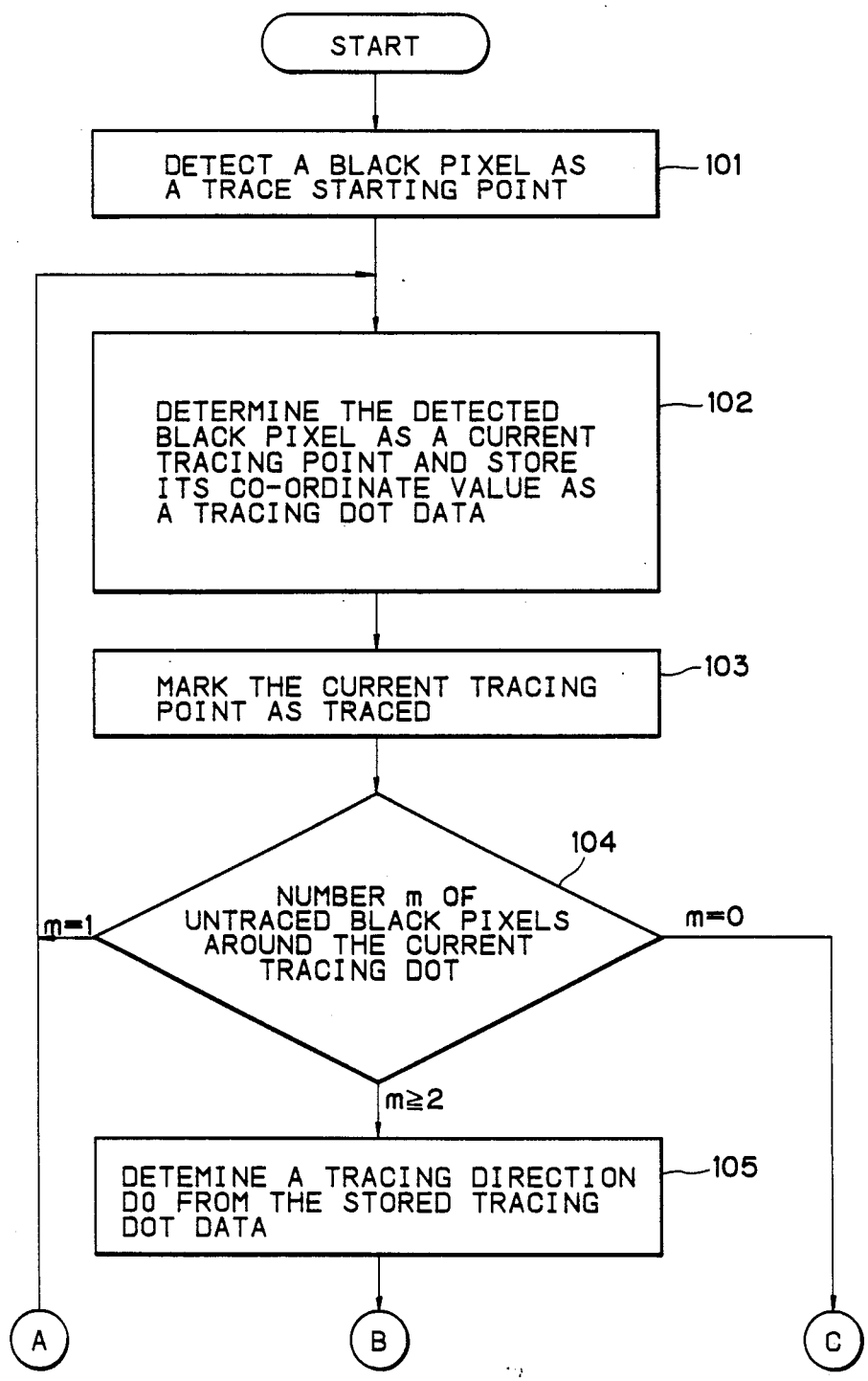

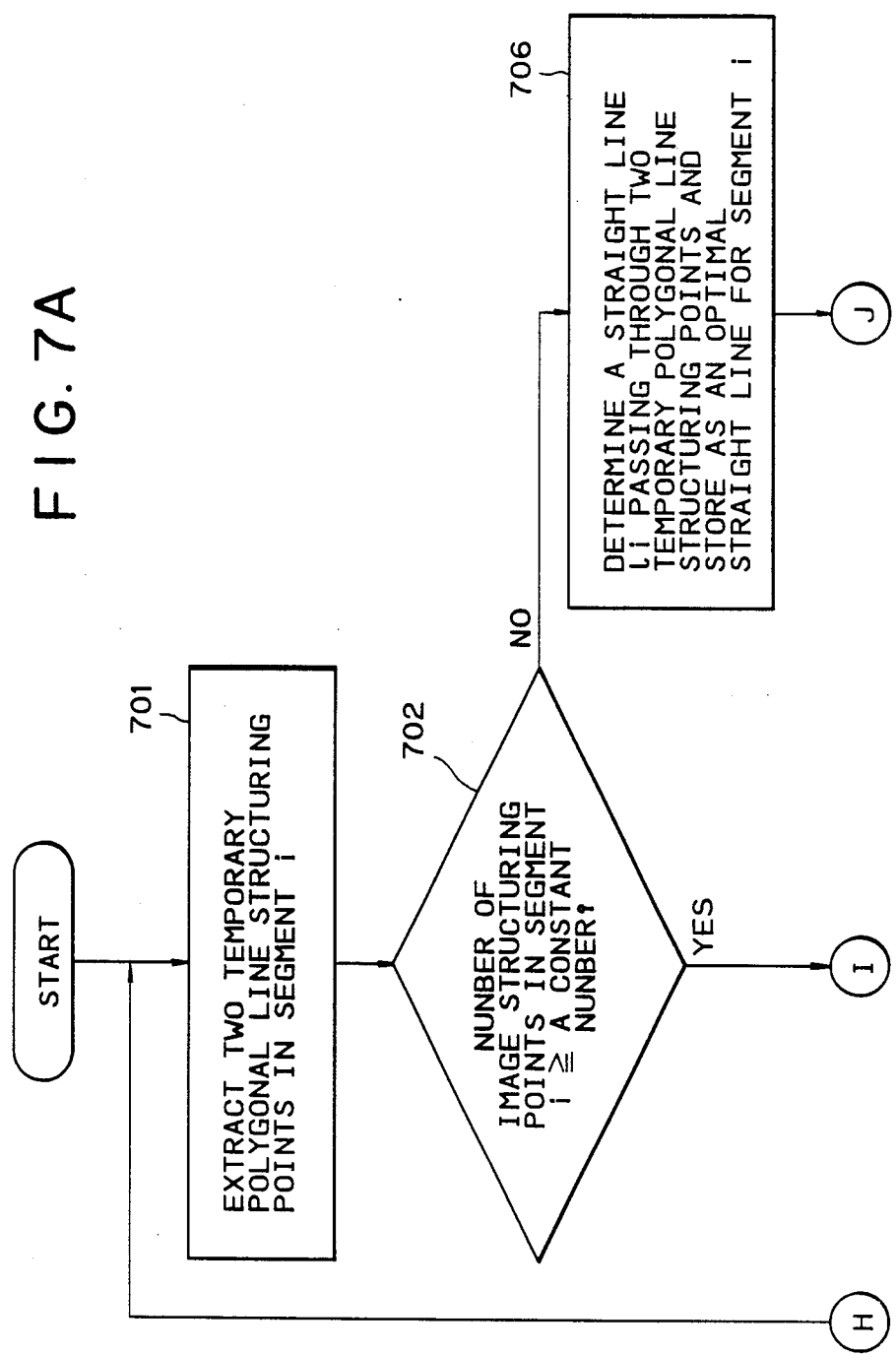

F I G. 8
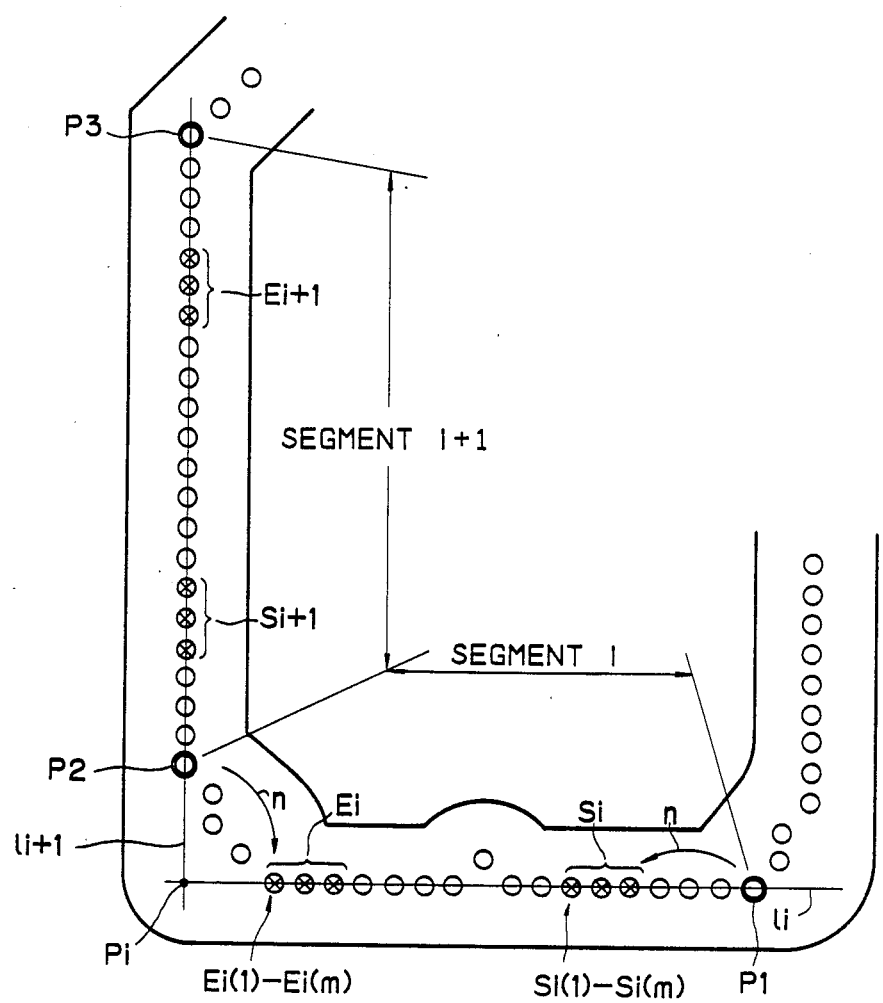

IMAGE PROCESSING SYSTEM HAVING POLYGONAL LINE PROCESSING OF PIXEL LINE DATA

BACKGROUND OF THE INVENTION

The present invention relates to an image processing device and, more particularly, to an image processing device, such as a computer aided design device, adapted to process pixel line data of an input drawing, including tracing the pixels, converting them into polygonal line data efficiently, and executing polygonal line processing stably to form a polygonal line data with a small transformation in a curved segment of an image.

In the computer aided design device, when drawing data is processed by digitizing a line drawing, a variety of shapes are extracted from the drawing in which various line segments are present. These segments are classified into drawing elements. As a pre-processing of the image processing, after the line drawing is read by a scanner and stored as pixel line data of a dot line image in a memory unit, the pixel line data is subjected to polygonal line processing for conversion into polygonal line data, thus approximating the drawing into a polygonal line by means of the polygonal line processing and classifying it into a drawing element.

The polygonal line processing for converting the pixel line data into polygonal line data is executed by a series of three processing steps in order, which include trace processing of a pixel line, polygonal line converting processing of the traced pixel line, and polygonal lines connecting processing. The trace processing of the pixel line is designed so as to form tracing dot data by tracing one pixel of the pixel line after another and to suspend the tracing when a branch point or a terminal point is detected. The polygonal line converting processing is to form a polygonal line from the tracing dot data for each of the traced pixel lines. The polygonal lines connecting processing is designed so as to connect each of the polygonal lines to form continuous polygonal line data, thus executing the polygonal line processing for conversion of the pixel line data into polygonal line data.

It is to be noted, however, that, in the polygonal line processing for converting the pixel line data into the polygonal line data, the trace processing of the pixel line stops at the branch point or the terminal point. Therefore, even if a pixel line of a dot line image in the neighborhood of a branch point continues in a direction in which the pixel line has been traced until then, the tracing is forced to stop at the branch point and thereafter the tracing dot data so far done is subjected to the processing for formation of a polygonal line. Then another trace processing of the pixel line begins from that branch point to form another polygonal line. Thereafter, the two polygonal lines are connected at the subsequent polygonal lines connecting processing. Accordingly, if a line extends in a straight direction, however, the pixel line cannot be continuously traced so that such a straight line cannot be formed by one trace processing. As a result, a number of connections with the polygonal lines connecting processing are required in the polygonal line processing, thus requiring a longer processing period of time for conversion into a polygonal line.

As shown in FIG. 9, for example, there is a technique of polygonal line processing for converting pixel line data into polygonal line data, which involves extracting as a polygonal line structuring point a pixel b(k) from a segment of a given pixel line b(m) of pixel line data from a drawing segmented by two given pixels b(i) and b(j) which are located at the i-th and j-th positions of the pixel line b(m), respectively, the pixel b(k) being in a distance most remote from and perpendicular to a straight line connecting the pixels b(i) and b(j) and apart in a distance equal to or longer than a constant distance, and converting the polygonal line structuring points into a polygonal line.

In approximating a drawing into a polygonal line by extracting polygonal line structuring points and converting them into a polygonal line by this polygonal line processing technique, an optimum pixel is designed so as to be extracted as a polygonal line structuring point from a pixel line of the pixel line data. However, a polygonal line is likely to be transformed at a curved portion of a drawing on account of a deviation in coordinates of pixels themselves due to digital noises so that it is hard to provide polygonal line data with a stable approximation of a polygonal line.

SUMMARY OF THE INVENTION

Therefore, the present invention has the object to provide an image processing device adapted to execute the polygonal line processing of the imput image data in such a manner as to provide a polygonal line with a small transformation at a curved portion thereof.

Another object of the present invention is to provide an image processing device adapted to scan the pixel line in the polygonal line processing of the pixel line data of the input image data in a straight direction as continuous as possible, thus forming a favorably continuous polygonal line and minimizing a total processing time required for the polygonal line processing.

In order to achieve the above objects, the image processing device according to the present invention has a pixel line tracing means for tracing one pixel of a pixel line after another to form tracing dot data, a tracing direction selecting means for selecting a direction of tracing of a pixel line substantially coinciding in a branch direction with a pixel line tracing direction on the basis of the tracing dot data by judging the branch direction from the pixel lines around a pixel at a branch point when the pixel line tracing means detects the branch point, and a polygonal line processing means for processing the pixel line data into polygonal line data by selecting the pixel line tracing direction by the tracing direction selecting means, and continuing the tracing of the pixel line in substantially the same direction as the so far traced direction beyond the branch point by the pixel line tracing means.

The pixel line tracing means is designed so as to form tracing dot data by tracing the pixel line, pixel by pixel. The tracing direction selecting means is designed so as to select the pixel line to be traced in a direction substantially coinciding with a pixel line tracing direction on the basis of the so far formed tracing dot line by judging the branch direction from a predetermined number of pixels of each of the pixel lines around the pixel at the branch point when the branch point is detected by the pixel line tracing means. The polygonal line processing means is designed so as to process the pixel line data into polygonal line data from tracing dot data by forming the tracing dot data while tracing one pixel of the pixel line after another by the pixel line tracing means, by detecting the pixel line in the direction substantially coinciding with the direction of the so far traced pixel line around the branch point, by continuing the tracing of the pixel line in substantially the same direction beyond the branch point by the tracing direction selecting means when the branch point is detected, and by forming the tracing dot line extending continuously in a straight direction prior to and subsequent to the branch point.

With this arrangement, the polygonal line converting processing on the basis of the tracing dot data obtained by the pixel line tracing processing provides the polygonal line data extending continuously in a straight direction through the branch point, thus requiring no subsequent processing for connection of the polygonal lines, and as a result shortening a total processing time required for the polygonal line processing for conversion of the pixel line data into the polygonal line data.

The polygonal line processing means of the image processing device according to the present invention is designed so as to select two image structuring points arbitrarily from the pixel line data as given structuring points, to extract an image structuring point as a temporary polygonal line structuring point from image structuring points present in a segment divided by the given structuring points, which is most remote in distance from a straight line connecting the given structuring points and which is located so as to allow the distance to be equal to or larger than a constant distance, to produce temporary polygonal lines from the thus obtained temporary polygonal line structuring points, to select a segment, as a given segment, divided by two adjacent temporary polygonal line structuring points read from the data of the temporary polygonal line structuring points obtained by the temporary polygonal line processing, to extract a plural number of image structuring points at a position spaced apart inside the segment from the temporary polygonal line structuring point at each of the terminal portions of the given segment when a number of the image structuring points of the pixel line data in the given segment is sufficiently large, to determine a mean coordinate value for the plural number of the image structuring points, and to provide a straight line connecting each of the mean coordinate values as a segmentally optimal straight line data, on the one hand, or to provide a straight line connecting the temporary polygonal line structuring points at each of the terminal portions of the given segment as a segmentally optimal straight line data when the number of the image structuring points of the pixel line data in the given segment is not sufficiently large, thus forming a polygonal line on the basis of an intersection point given by intersecting adjacent segmentally optimal straight line data with each other.

In other words, the polygonal line processing involves a conversion of the pixel line data into temporary polygonal line data by first extracting a temporary polygonal line structuring point from the given pixel line data. The temporary polygonal line structuring point is an image structuring point in a segment divided by the two given structuring points selected arbitrarily from the pixel line data, which is most remote in distance from the straight line connecting the two given structuring points and whose distance from the straight line is equal to or larger than the constant distance. By such polygonal line processing it can be expected that the temporary polygonal line structuring points may be located at or nearby optimal temporary polygonal line structuring points.

In determining the optimal polygonal line structuring point, the segment divided by two adjacent temporary polygonal line structuring points in the data of the temporary polygonal line structuring points is selected as the given segment, a number of the image structuring points of the pixel line data in the given segment is counted. Then plural image structuring points are extracted at positions spaced apart by a predetermined number of image structuring points inside the segment from each of the temporary polygonal line structuring points at a terminal portion of the given segment when the number of the image structuring points of the pixel line data in the given segment is sufficiently large, and a mean coordinate value of the plural image structuring points is determined, thus providing the straight line connecting each of the mean coordinate values as a segmentally optimal straight line data. When the number of the image structuring points is not sufficiently large, the straight line connecting the temporary polygonal line structuring points at the terminal portions of the given segment is given as segmentally optimal straight line data, and an intersection point obtainable by extending the adjacent optimal straight line data is determined as a polygonal line structuring point and the optimal straight line converted into a polygonal line.

In order to execute the polygonal line processing, the polygonal line structuring point is selected from the image structuring points in the pixel line data so as to avoid the vicinity of the temporary polygonal line structuring point at a curved portion because in this vicinity it is most likely that digital noise will occur, and a segmentally optimal straight line is provided in the segment divided by the temporary polygonal line structuring points. The optimal straight line data for a first segment is then extended to provide as a polygonal line structuring point an intersection point crossing an optimal straight line for a second segment adjacent to that for the first segment, thus approximating the image data into a polygonal line with a small transformation of a curved portion of a drawing without undergoing digital noises in the polygonal line processing for approximating the drawing into a polygonal line.

BRIEF DESCRIPTION OF THE DRAWINGS

Other objects and features of the present invention will become apparent in the course of the following description of the preferred embodiments in conjunction with the drawings as follows:

FIG. 8 is an explanation diagram for explaining operation of the polygonal line processing from the temporary polygonal line data.

DESCRIPTION OF THE PREFERRED EMBODIMENTS

Figure 1:
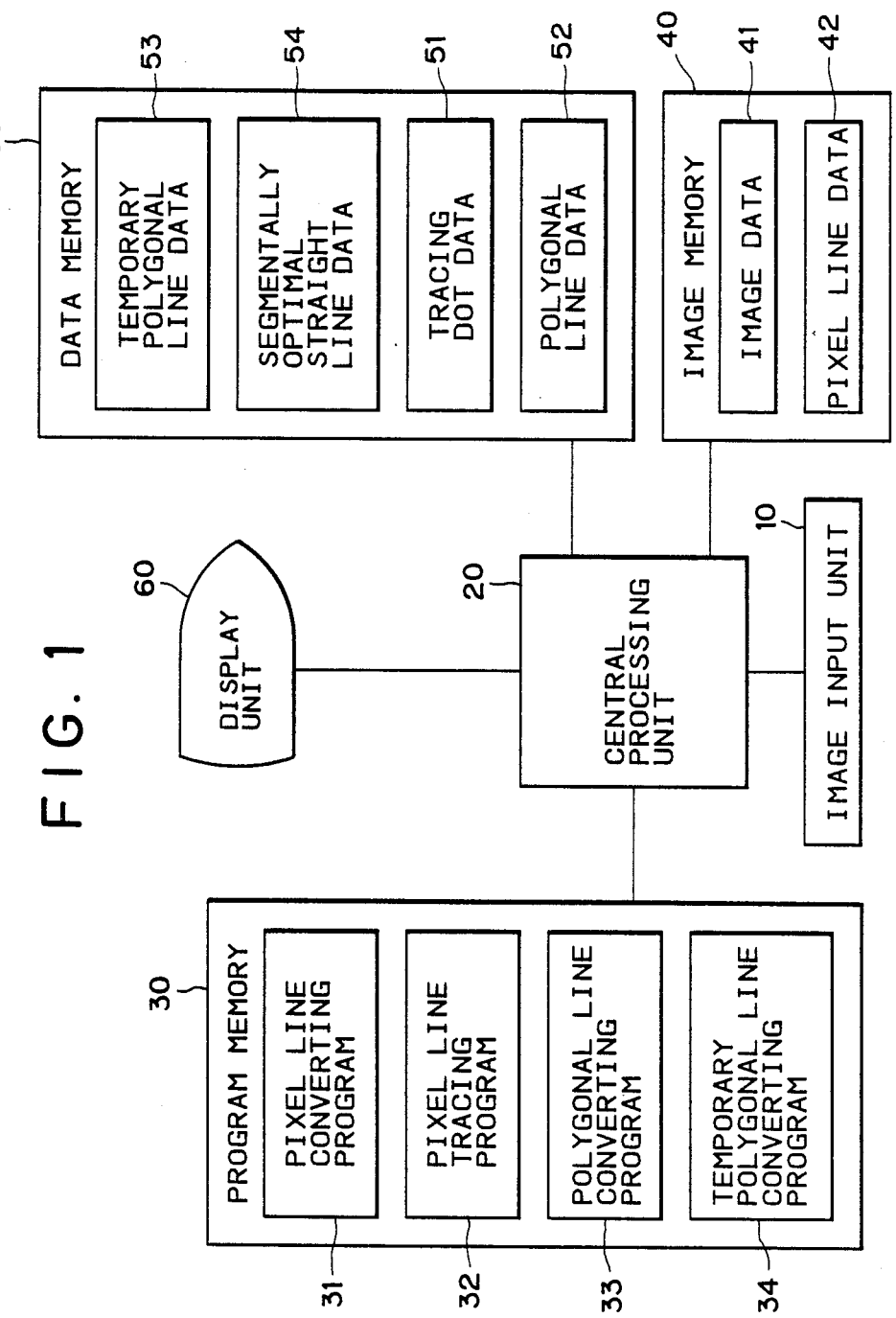
FIG. 1 is a block diagram showing the construction of one example of the image processing devices according to the present invention.

As shown in FIG. 1, an image processing device as one example according to the present invention comprises an image input unit 10 for inputting an image, a central processing unit 20 for executing various processing, a program memory 30 for storing a program necessary for execution in the central processing unit 20, an image memory 40 for storing an image data input from the image input unit 10 and a pixel line data 42 of a dot line image, a data memory 50 for storing a tracing dot data 51, a polygonal line data 52, a temporary polygonal line data 53 and a segmentally optimal straight line data 54, and a display unit 60 for displaying the image data 41, the polygonal line data 52 and so on.

In the image memory 40 are stored the image data 41 and the pixel line data 42, the image data 41 being input from the image input unit 10 and the pixel line data 42 being obtained by converting the image data 41 into a pixel line of a dot line image. In the data memory 50 are stored the tracing dot data 51 and the polygonal line data 52, the tracing dot data 51 being data obtained by tracing a pixel line of the pixel line data 42, and the polygonal line data 52 being obtained by converting the tracing dot data 51 into a polygonal line.

The program memory 30 stores a pixel line program 31 for converting the image data 41 into the pixel line data 42 of the dot line image, and a pixel line tracing program 32 for providing the tracing dot data 51 by tracing a pixel line of the pixel line data 42. In order to generate the polygonal line data 52 using the tracing dot data 51, the program memory 30 is further designed so as to store a temporary polygonal line program 34 for converting the pixel line data 42 into a temporary polygonal line data 53, and a polygonal line converting program 33 for providing the polygonal line data 52 by determining the segmentally optimal straight line data 54 in a line segment of the temporary polygonal line data from the temporary polygonal line data 53.

The central processing unit 20 first converts the image data 41 in the image memory 40 into the pixel line data 42 on the basis of the pixel line converting program 31 of the program memory 30 and stores the pixel line data 42 in the image memory 40. Then, on the basis of the pixel line tracing program 32 of the program memory 30, the pixel line of the pixel line data 42 in the image memory 40 is subjected to the pixel line trace processing, thus storing the resultant tracing dot data 51 in the data memory 50. Thereafter, on the basis of the temporary polygonal line converting program 34 and the polygonal line converting program 33 in the program memory 30, the tracing dot data 51 in the data memory 50 is converted into the polygonal line data 52, and the polygonal line data 52 is displayed on the display unit 60. In other words, the central processing unit 20 is designed to process the pixel line data 42 on the basis of the temporary polygonal line converting program 34 in the program memory 30 and store the temporary polygonal line data 53 in the data memory 50. Then the central processing unit 20 provides the segmentally optimal straight line data 54 for each of segments between temporary polygonal line structuring points from the pixel line data 42 in the image memory 40 and the temporary polygonal line data 53 in the data memory 50 on the basis of the polygonal line converting program 33 in the program memory 30, determines the polygonal line data 52 from the segmentally optimal straight line data 54, and stores the polygonal line data 52 in the data memory 20. The central processing unit 20 then displays the resultant polygonal line data 52 on the display unit 60.

Figure 2B:
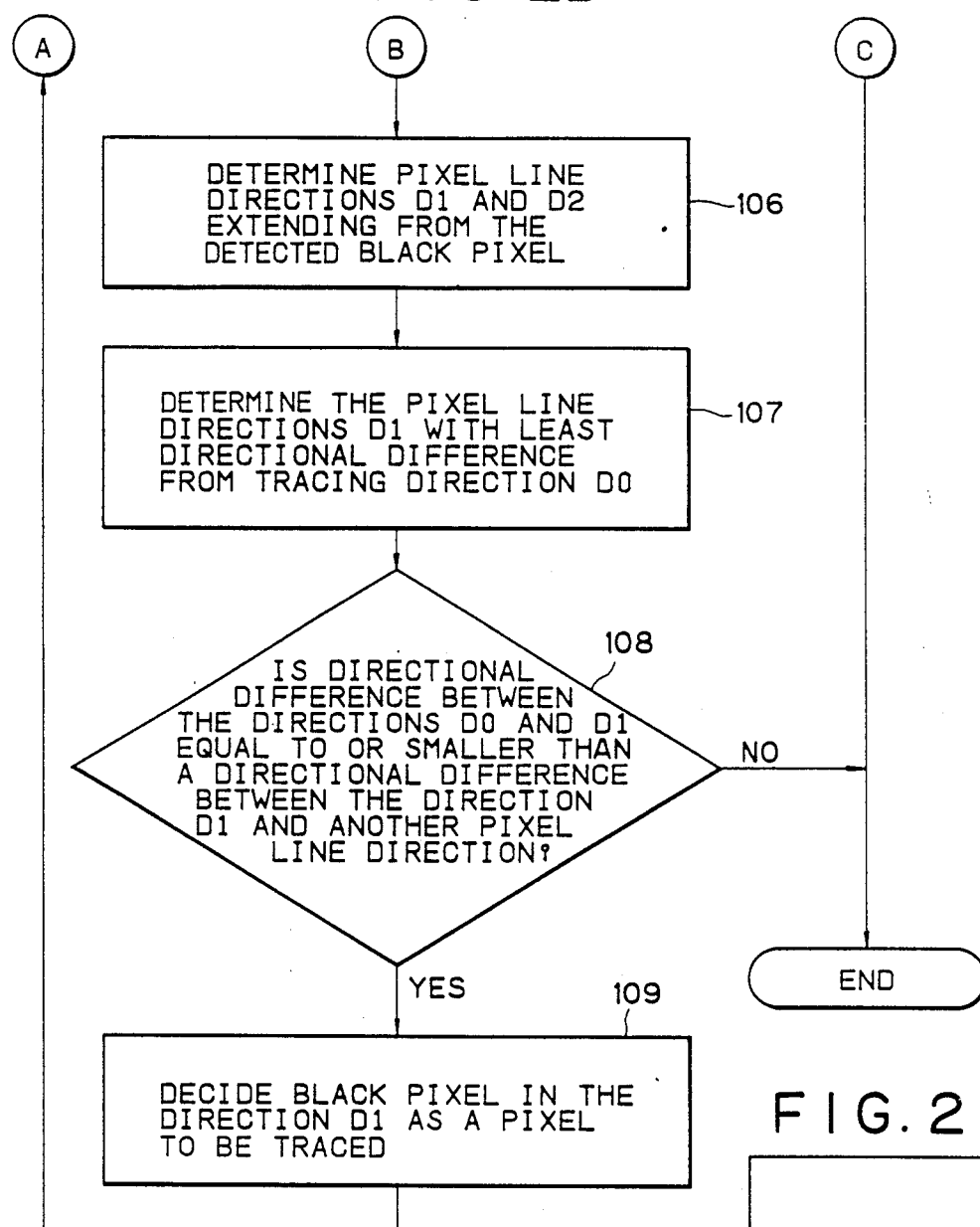
FIGS. 2a and 2b are each portions of a flowchart showing a processing flow for the pixel line tracing processing.
Figure 2:
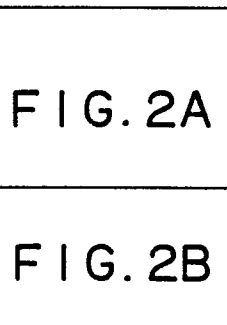
Figure 3:
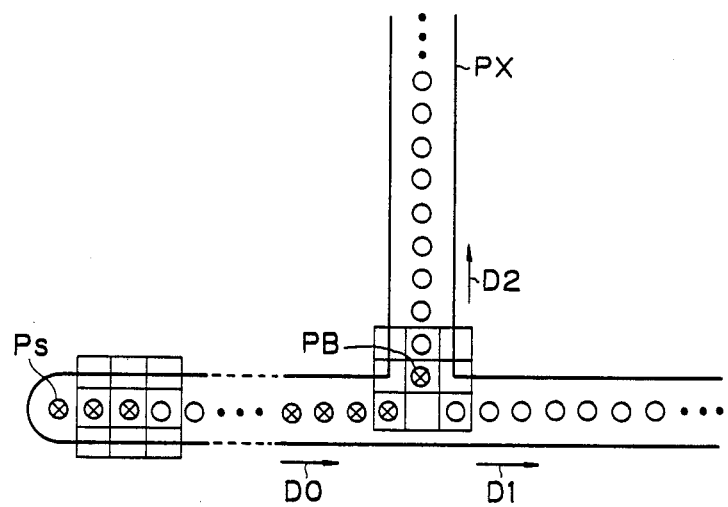
FIG. 3 is an explanation diagram for explaining the tracing direction selection processing of the pixel line at the branch point.

FIGS. 2a, 2b and 2c together show a flowchart illustrating the processing flow of the pixel line tracing processing. FIG. 3 is an explanation view for explaining the processing for selecting a direction of continued tracing of a pixel line at a branch point in the pixel line trace or tracing processing. The pixel line tracing processing will be described in accordance with FIG. 2 with reference to FIG. 3.

Given the presence of the pixel line data 42 in the image memory 40, a pixel line of the pixel line data 42 is traced in order to form tracing dot data and the processing is continued to be executed beyond a branch point as the branch point is detected.

First, at step 101, a pixel line PX of the pixel line data 42 is traced and a black pixel Ps is detected as a tracing starting point. Then at step 102, a coordinate value of the black pixel Ps detected as a current tracing point is stored in the data memory 50 as the tracing dot data 51. At step 103, the current tracing point is then marked as traced. Then at step 104, there is judged a number m of black pixels which are not yet traced around the pixel of the current tracing point. When the number m of untraced black pixels is zero at the step 104, it is found that the black pixel at the current tracing point is a pixel at a terminal point so that the tracing of the pixel line concludes. When the number m of the untraced black pixels is 1, it is found that there is an untraced black pixel following the black pixel at the current tracing point extending in one direction so that the flow returns to the step 102 for continuing the tracing processing from the untraced black pixel as a new current tracing point. Then the tracing is continued to be done by storing a coordinate value of the traced black pixel as the current tracing point in the data memory 50 as the tracing dot data 51.

When the number m of untraced black pixels is 2 or more, it is found that there are untraced black pixels following the black pixel at a current tracing point in two directions or more, and the black pixel at the current tracing point is found to be a pixel PB at a branch point. In this case, as the pixel line to be traced branches into two directions or more, the processing from step 105 is executed in order to judge a direction in which the tracing is to be continued. At the step 105, there is given a direction D0, in which the pixel line has been traced so far, from the tracing dot data 51 stored by the tracing processing of the pixel line. Then at step 106, there are given, for examples, two directions D1 and D2 of pixel lines constituted by untraced black pixels connected to and extending from the pixel PB at the branch point. The processing of the pixel line directions D0, D1 and D2 is implemented, for example, by sampling five pixels of the pixel lines around the pixel PB at the branch point and averaging the coordinates of the pixel lines, thus providing directions of the pixel lines. Then at step 107, there is determined the pixel line direction D1 which is least in directional difference from the tracing direction D0 of the pixel line traced so far. And at step 108, it is checked whether or not a directional difference between the pixel line direction D1 and the traced direction D0 is larger than a directional difference between the pixel line direction D1 and another pixel line direction D2. If it is found that the directional difference between the pixel line direction D1 and the traced direction D0 is not larger, the pixel line direction D1 can be found substantially straight from the traced direction D0 so that the flow advances to step 109. At the step 109, a black pixel of the pixel line in the pixel line direction D1 is then determined to be a black pixel of the pixel line in a direction in which the pixel line should be continuously traced. Then the flow returns to the step 102 where the tracing processing of the pixel line is continued. On the other hand, if the directional differential between the pixel line direction D1 and the traced direction D0 is larger, the tracing is finished. This direction cannot be a direction in which the pixel line advances straight and it is found a branch point so that the tracing processing stops in order to implement the processing at the branch point.

A series of the pixel line tracing processing is repeatedly executed until no untraced pixel is present any more.

Figure 4A:
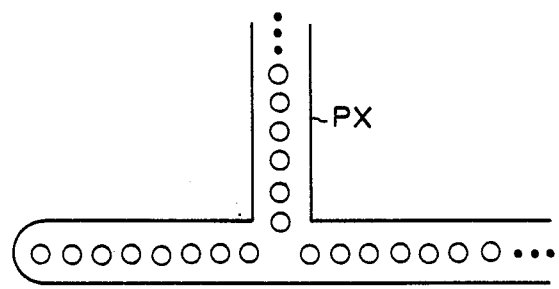
FIGS. 4a, 4b and 4c are each a diagrammatical view showing the order of the polygonal line processing by tracng the pixel line by the pixel line tracing processing and providing the tracing dot data.
Figure 4B:
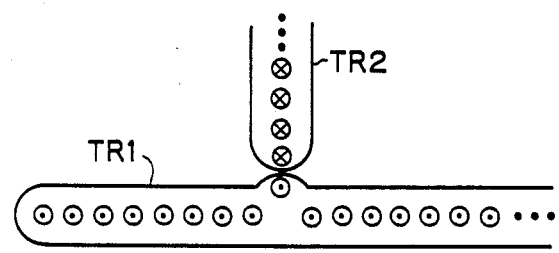
Figure 4C:
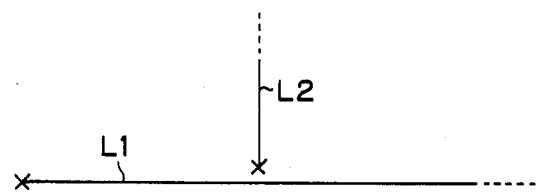

FIGS. 4a, 4b and 4c show an order of results of the processing for conversion into a polygonal line by tracing the pixel line by means of the pixel line tracing processing as above and providing a given tracing dot data. As a result of tracing the pixel line of the pixel line data PX as shown in FIG. 4a, there are given tracing data TR1 and TR2 of each of the tracing dot lines as shown in FIG. 4b. By executing the polygonal line coverting processing using the tracing data TR1 and TR2 of the tracing dot lines obtained by the tracing processing, there is given a data for polygonal lines L1 and L2 each extending continuously in a straight direction even at a branch point, as shown in FIG. 4c. Accordingly, one connection processing can be omitted which otherwise should be done to connect the polygonal line segments at the branch point after the tracing processing, thus shortening a total processing time required for conversion of the pixel lines into polygonal lines to a considerable extent.

Figure 5A:
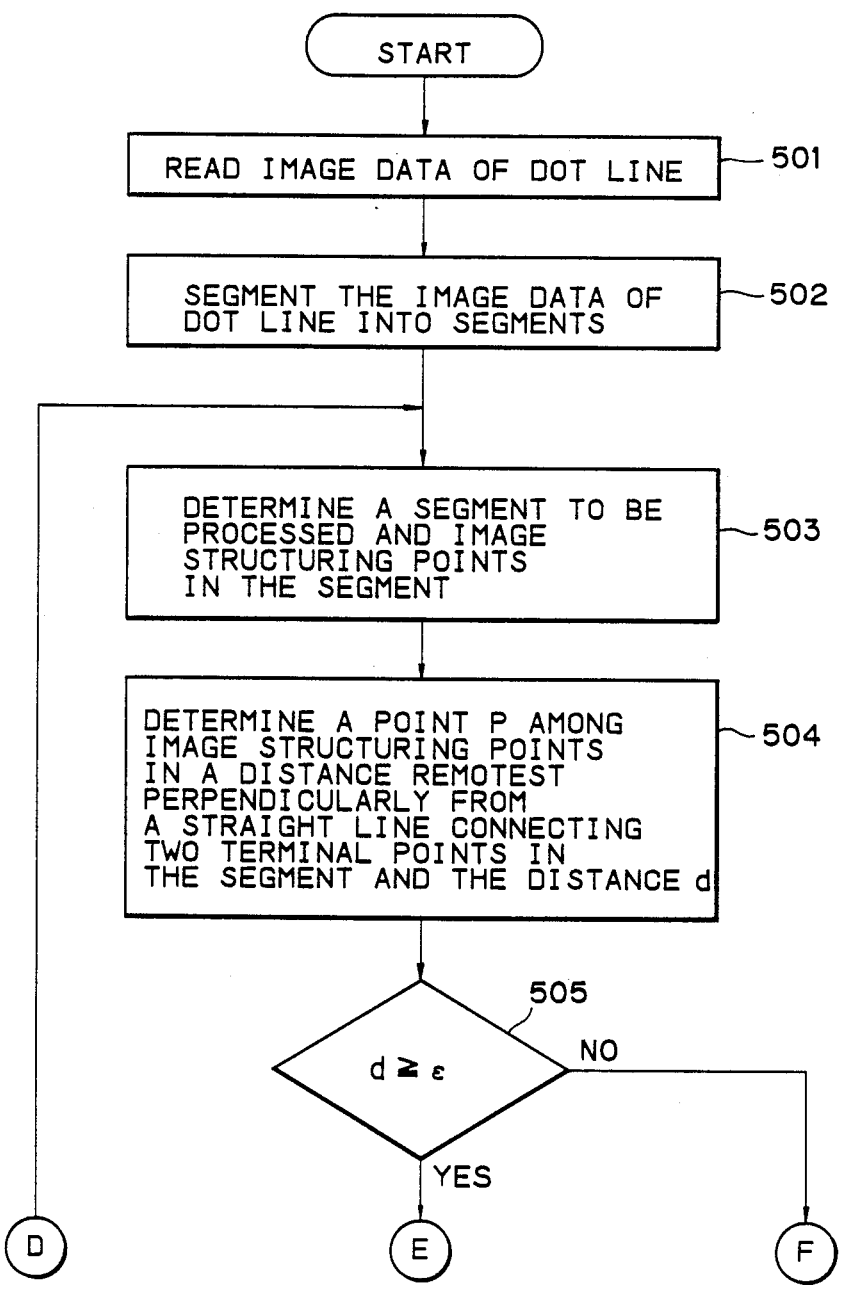
FIGS. 5a, 5b, and 5c are each portions of a flowchart showing a processing flow for the temporary polygonal line processing.
Figure 5B:
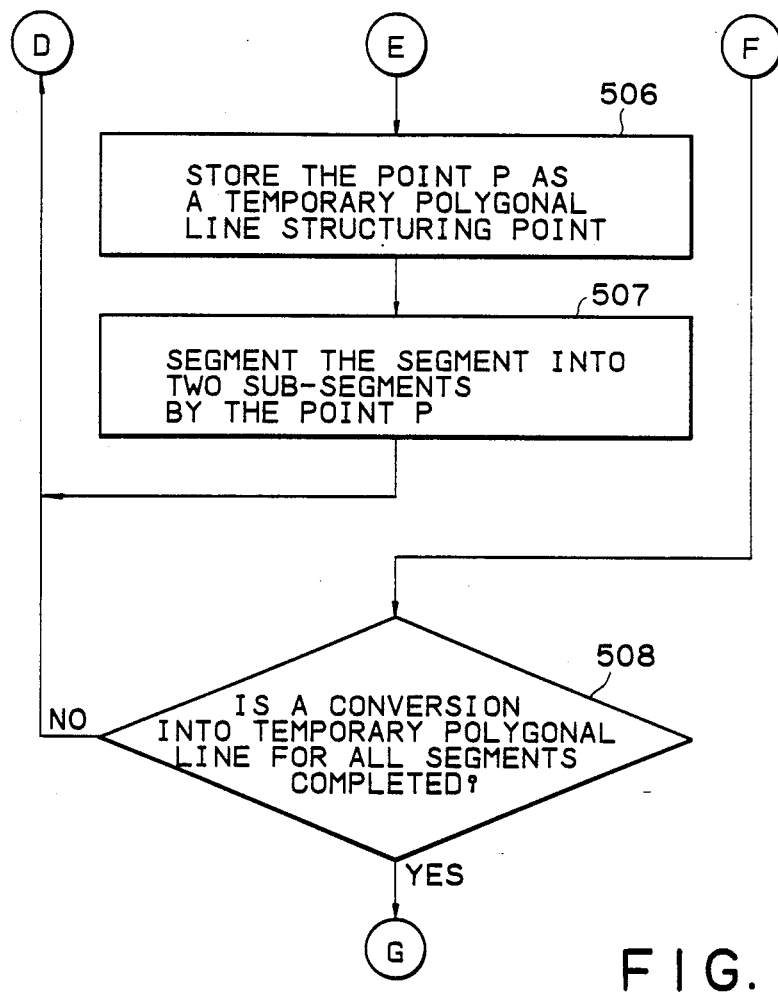
Figure 5:
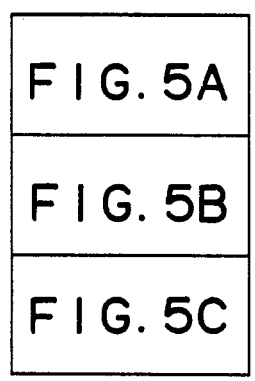
Figure 5C:
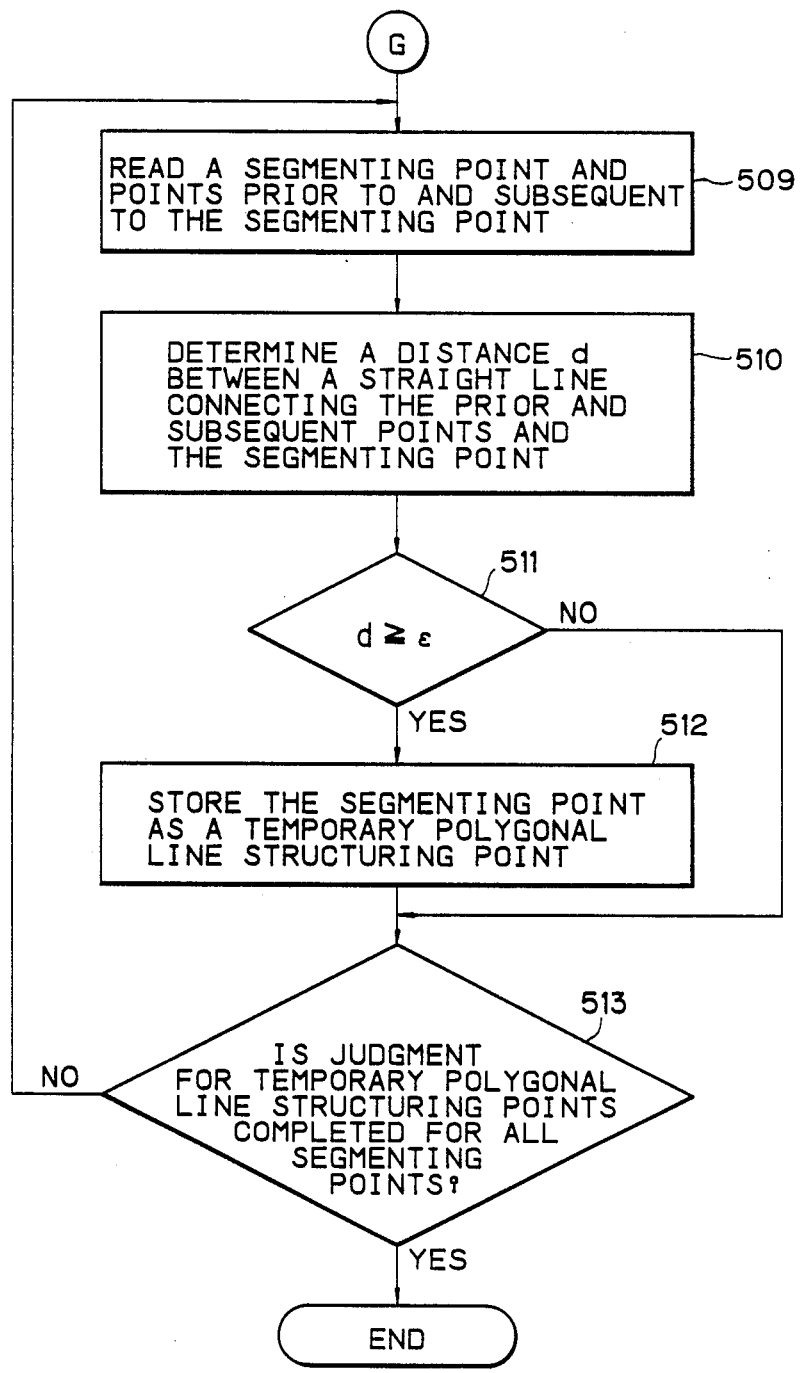
Figure 6:
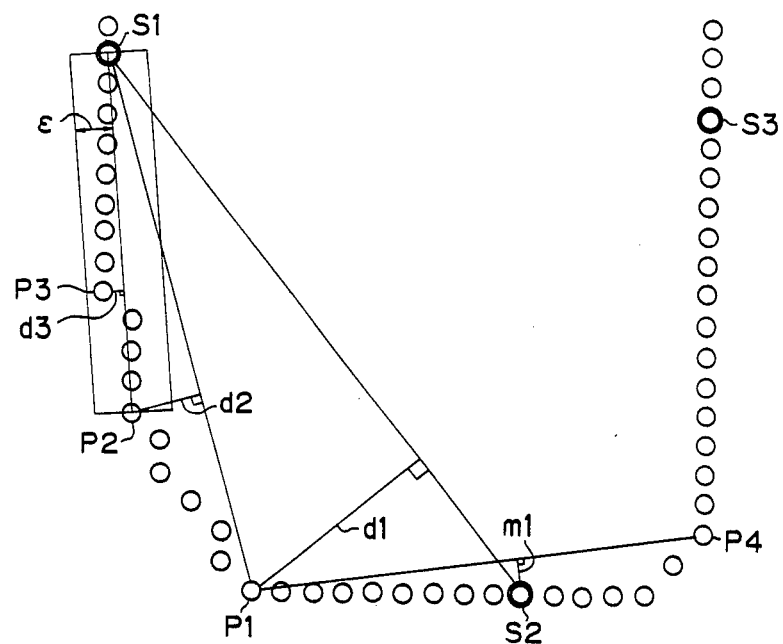
FIG. 6 is an explanation diagram for explaining operation of the temporary polygonal line processing.

FIGS. 5a, 5b and 5c together constitute a flowchart illustrating the processing flow of the temporary polygonal line processing, and FIG. 6 is an explanation view for explaining the operation of the temporary polygonal line processing. This processing will be described in accordance with FIG. 5 with reference to FIG. 6.

It is presumed that the pixel line data 42 of the dot line pixels is stored in the image memory 40. In the central processing unit 20, the pixel line data 42 is read from the image memory 40 and subjected to the temporary polygonal line processing. First, at step 501, the pixel line data of the dot line pixels is read, and at step 502, the pixel line data is segmented into an appropriate number of segments. Then for each of the segments, the processing from step 503 is executed for conversion into a temporary polygonal line.

At the step 503, there is given a segment to be processed (for example, in FIG. 6, a segment between a segmenting point S1 and a segmenting point S2), and image structuring points present in the segment are counted. Then at step 504, there are determined a point P among the image structuring points which is most remote from and perpendicular to a straight line connecting two terminal points in the segment, and a perpendicular distance d between the straight line and the point P. For instance, in FIG. 6, a point P1 and a distance d1 are determined. Then the flow advances to step 505 where it is judged whether or not the distance d determined at the step 504 is equal to or longer than a constant distance ε. If the distance d is equal to or longer than the constant distance ε, on the one hand, the flow proceeds to step 506 and the point P (P1 in FIG. 6) is stored as a temporary polygonal line structuring point. Then at step 507, the corresponding segment is further segmented by the point P1 into two sub-segments. The flow then returns to the step 503, the processing for conversion into a temporary polygonal line from the step 503 is repeated for each of the sub-segments to extract temporary polygonal line structuring points and store them. For instance, in FIG. 6, point P2 and distance d2, point P3 and distance d3 as well as point P1 and distance d1 are determined in the order, and the points P1, P2 and P3 are extracted and stored as temporary polygonal line structuring points. If the distance d is shorter than the constant distance ε at the step 505, on the other hand, the point P is not determined as a temporary polygonal line structuring point and the flow proceeds to step 508 where it is judged whether or not the processing for conversion into a temporary polygonal line is completed for all the segments. If there is left a segment unprocessed for conversion into a temporary polygonal line, that is, if there remains a segment where no temporary polygonal line structuring point is yet extracted, on the one hand, the flow returns to the step 503 where the temporary polygonal line processing is repeated. If the temporary polygonal line processing is completed for all of the segments, on the other hand, the flow proceeds to step 509 and it is judged whether or not a segmenting point for first segmenting the pixel line data into an appropriate number of segments at the step 502 (for example, point S1, point S2, point S3, . . . as shown in FIG. 3) is a temporary polygonal line structuring point.

At step 509, a segmenting point and points subsequent to and prior to the segmenting point are read. For instance, in FIG. 6, there are read a segmenting point S2 as well as its prior point P1 and its subsequent point P4. Then at step 510, a distance d between a straight line connecting the prior and subsequent points and the segmenting point is determined. For instance, in FIG. 6, a distance m1 between the segmenting point S2 and the straight line is given. At step 511, it is discriminated whether or not the distance d is equal to or longer than the constant distance ε. If the distance d is equal to or longer than the constant distance ε, on the one hand, the flow proceeds to step 512 and the segmenting point, for example, the point S2, is stored as a temporary polygonal line structuring point and then the flow proceeds to step 513. If the distance d is shorter than the constant distance ε at the step 511, on the other hand, the segmenting point does not constitute a temporary polygonal line structuring point and the flow then proceeds to the step 513 where it is judged whether or not this judgment for a temporary polygonal line structuring point has been finished for all the segmenting points. If there is left a segmenting point unjudged for a temporary polygonal line structuring point, on the one hand, the flow then returns to the step 509 and the processing for judgement of a temporary polygonal line structuring point is repeated. If the processing for judgment of a temporary polygonal line structuring point for all the segmenting points has been finished, on the other hand, the temporary polygonal line processing is finished.

It is to be noted here that, in segmenting the pixel line data into an appropriate number of segments at the step 502, a terminal point of the pixel line data naturally becomes a segmenting point as well as a temporary polygonal line structuring point so that no processing for judging a temporary polygonal line structuring point from the step 502 to the step 513 is required. Thus, for instance, the terminal point is stored as a temporary polygonal line structuring point at the step 502.

As have been described hereinabove, the pixel line data 42 in the image memory 40 is subjected to the temporary polygonal line converting processing in accordance with the temporary polygonal line converting program 34 to form the temporary polygonal line data 53 which in turn is stored in the data memory 50.

The temporary polygonal line data 53 obtained as described hereinabove is then subjected to the polygonal line processing to form the polygonal line data 52 on the basis of the polygonal line converting program 33.

Figure 7B:
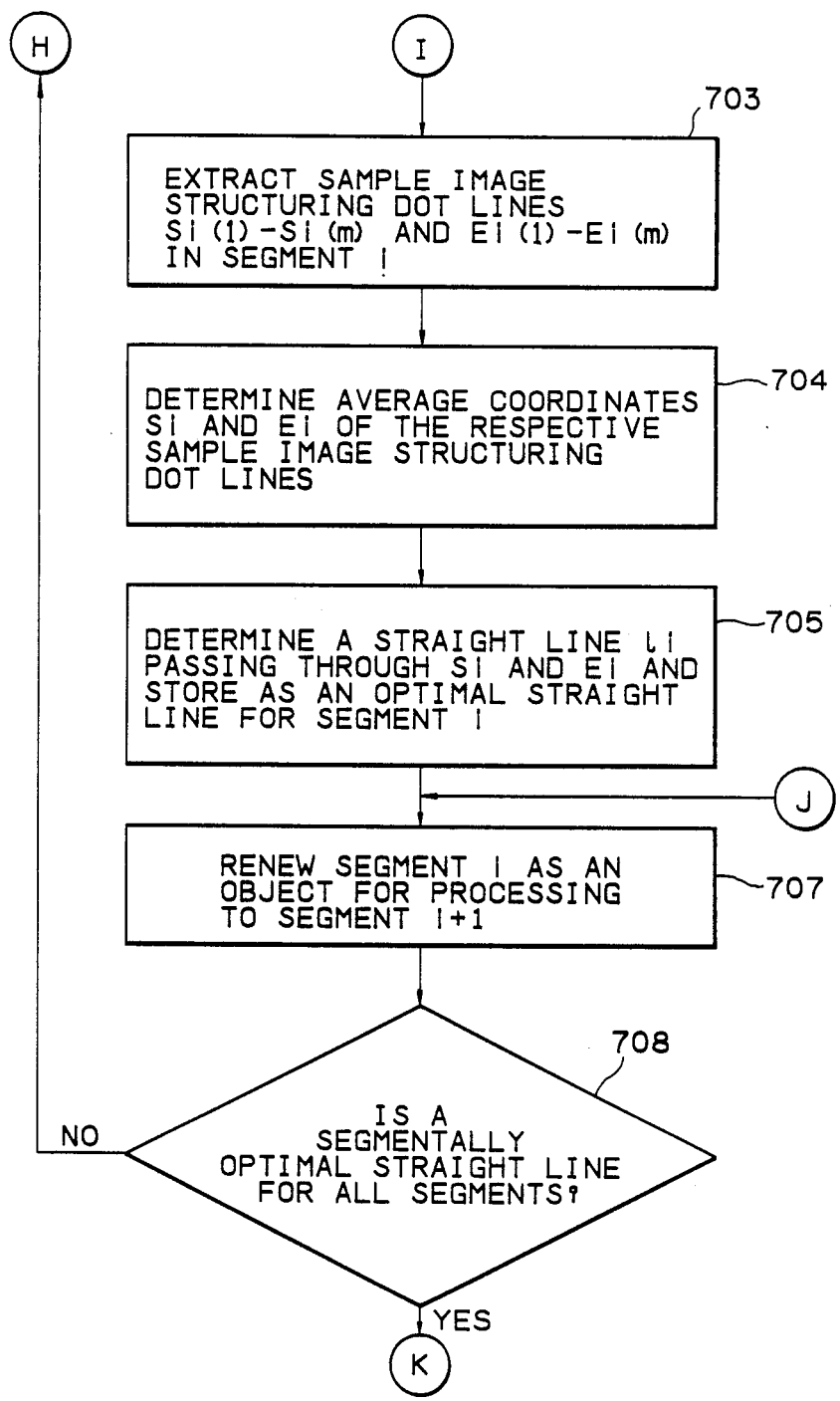
FIGS. 7a, 7b and 7c are each portions of a flowchart showing a processing flow for providing a polygonal line from the temporary polygonal line data.
Figure 7C:
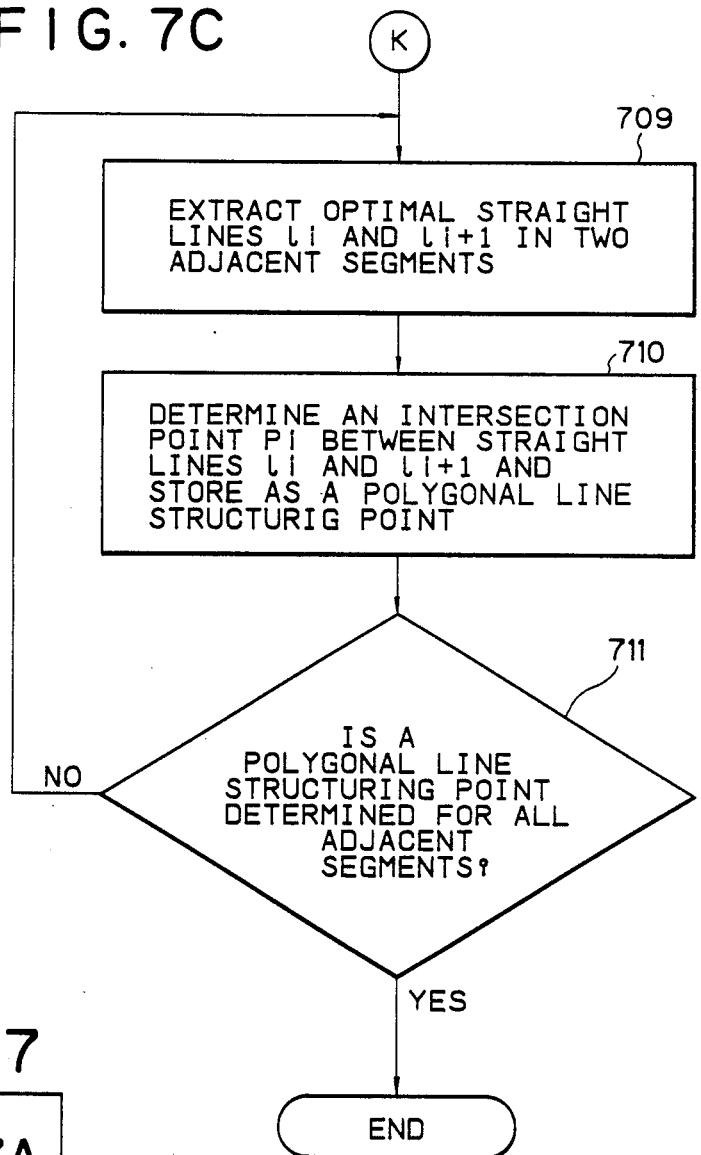
Figure 7:
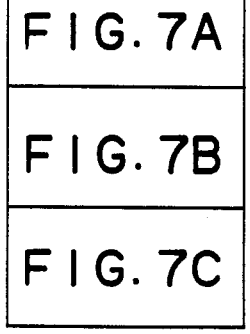
Figure 9:
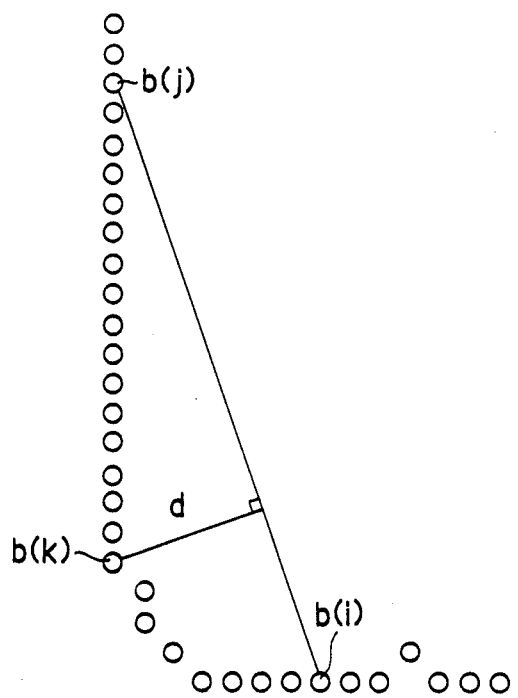
FIG. 9 is an explanation diagram for explaining a conventional example for obtaining a polygonal line from a temporary polygonal line data.

FIG. 7 is a flowchart illustrating the processing flow for providing the polygonal line data from the temporary polygonal line data. FIG. 8 is an explanation diagram for explaining the operation of the processing for providing the polygonal line from the temporary polygonal line. The polygonal line processing will be described in accordance with FIG. 7 with reference to FIG. 8. In the image memory 40 is stored the pixel line data 42, and the data memory 50 stores the temporary polygonal line data 53 formed by the temporary polygonal line processing on the basis of the temporary polygonal line converting program 34. The central processing unit 20 reads the pixel line data 42 of the image memory 40 and the temporary polygonal line data 53 of the data memory 50 and implements the polygonal line processing. First, at step 701, a segment at an i-th position of the pixel line data segmented by temporary polygonal line structuring points is given, and two temporary polygonal line structuring points P1 and P2 in the segment i are extracted. Then at step 702, it is judged whether or not a number of image structuring points in the given segment i is equal to or more than a constant number. If the number of the image structuring points is equal to or more than the constant number, on the one hand, the flow proceeds to step 703 and image structuring points Si(1)-Si(m) and Ei(1)-Ei(m) of m dots from the n-th image structuring point located inside the segment i from the temporary polygonal line structuring points P1 and P2 of the segment, respectively, are extracted as sample data constituting an optimal straight line i for the segment i. Then at step 704, means coordinates Si and Ei are determined from coodinate values of the respective image structuring points Si(1)-Si(m) and Ei(1)-Ei(m) of the pixel line data, and at step 705, there is determined a straight line i passing through the mean coordinates Si and Ei and stored in the data memory 50 as an optimal straight line data for the segment i. Then the flow proceeds to step 707 where the segment i as an object for the processing is renewed to a next segment i+1.

If the number of the image structuring points of the pixel line data within the segment i is less than the constant number at the step 702, the flow proceeds to step 706 where a straight line i passing through the two temporary polygonal line structuring points is given and stored in the data memory 50 as an optimal straight line data for the segment i. And at step 707, the segment i as an object for the processing is renewed to a next segment i+1.

At step 708, it is judged whether or not there is left a segment where no optimal straight line is yet determined. If such a segment is left, on the one hand, the flow returns to the step 701 and the processing for providing an optimal straight line from the step 701 is repeated for such an undetermined segment. If all the segments are determined for their optimal straight lines, on the other hand, the flow proceeds to step 709 where two segmentally optimal straight lines i and i+1 for the adjacent two segments are extracted from the segmentally optimum straight line data 54 stored in the data memory 50. Then, at step 710, an intersection point Pi obtainable by intersecting the two segmentally optimal straight lines i and i+1 is determined and stored in the data memory 50 as a polygonal line structuring point. At step 711, it is then judged whether or not a polygonal line structuring point is determined for all the adjacent segments. If there is a segment where no polygonal line structuring point is determined, on the one hand, the flow then returns to step 709 and the processing is repeated for the adjacent segments at the steps 709 and 710. If a polygonal line structuring point is determined for all the segments, on the other hand, the polygonal line processing is finished.

As has been described hereinabove, in this embodiment, a straight line in such a direction as being indicated by a dot line image of image structuring points in a segment is determined as a segmentally optimal straght line from a sample data of the image structuring points in the segment divided by two adjacent temporary polygonal line structuring points in accordance with the pixel line data 42 and the temporary polygonal line structuring points data, and then an intersection point of the two adjacent segmentally optimal straight lines is determined as a polygonal line structuring point. This permits an approximation of a drawing into a polygonal line with a small transformation in a curved portion due to digital noise because the drawing is provided by the polygonal line data for approximation into a polygonal line.

The present invention has been described specifically by way of examples, but it should be understood that the present invention is not limited by any means to the above examples and is interpreted to encompasss various modifications within a scope of the spirit of the invention without departure therefrom.

As have been described hereinabove, the present invention provides an image processing device for the polygonal line processing for processing a pixel line data into a polygonal line data in which the pixel line tracing processing for a polygonal line provides a tracing dot data by continuously tracing in a straight tracing direction prior to and subsequent to a branch point. This tracing dot data is used for the polygonal line converting processing in the polygonal line processing so that there is a polygonal line data continuing in a straight direction nearby the branch point, thus minimizing the subsequent connection processing of the polygonal line segments and shortening to a great extent a total processing time required for the conversion of the pixel line data into the polygonal line data.

What is claimed is:

1. An image data processing device for processing pixel line data representative of a plurality of pixels as the image data by converting said pixel line data into polygonal line data, comprising:

means for trace processing the pixel line data by tracing one pixel after another to form tracing dot data corresponding to said pixel line data;

means for detecting one of said tracing dot data as a branch point pixel wherein at least two pixel lines extend from said branch point pixel;

means for determining a number of untraced pixels around a branch point pixel when a branch point pixel is detected;

means responsive to said number of untraced pixels determining means when one or more untraced pixels around said branch point are determined for selecting a direction of continued tracing with respect to a tracing direction followed up to said branch point pixel, including means for reading a predetermined number of pixels of each of said pixel lines extending from said branch point pixel and averaging the coordinate values for each of said predetermined number of pixels that are read to determine an extending direction for each said pixel line extending from said branch point pixel, and means for determining one of said pixel lines as having an extending direction with a least directional difference with respect to said tracing direction followed up to said branch point pixel, said least directional difference being a first directional difference, and means for determining a second directional difference between said one pixel line and any other of said pixel lines, such that if said first directional difference is not larger than said second directional difference, said direction selecting means selects the extending direction of said one pixel line as said direction of continued tracing; and means for converting said tracing dot data into a polygonal line extending across said branch point pixel.

2. A method for processing pixel line data representative of a plurality of pixels by converting said pixel line data into polygonal line data, comprising:

trace processing the pixel line data by tracing one pixel after another to form tracing dot data corresponding to said pixel line data;

detecting one of said tracing dot data as a branch point pixel wherein at least two pixel lines extend from said branch point pixel;

determining a number of untraced pixels around a branch point pixel when a branch point pixel is detected;

selecting a direction of continued tracing with respect to a tracing direction followed up to said branch point pixel when one or more untraced pixels around said branch point are determined, including reading a predetermined number of pixels of each of said pixel lines extending from branch point pixel and averaging the coordinate values of said predetermined number of pixels that are read to determine an extending direction for each said pixel line extending from said branch point pixel, and determining one of said pixel lines as having an extending direction with a least directional difference with respect to said tracing direction followed up to said branch point pixel, said least directional difference being a first directional difference, and determining a second directional difference between said one pixel line and any other of said pixel lines such that if said first directional difference is not larger than said second directional difference, said extending direction of said one pixel line is selected as said direction of continued tracing; and converting said tracing dot data into a polygonal line extending across said branch point pixel.

3. A method for converting pixel line image data stored in memory into polygonal line data in an image processing device, comprising:

a temporary polygonal line processing step, including reading said pixel line image data and selecting an arbitrarily defined one of a plurality of first segments of said pixel line data having first segment end points and image structuring points within said first segment; determining one of said image structuring points with reference to a straight line passing through said first segment end points that is greatest in perpendicular distance from said straight line; comparing said perpendicular distance with a predetermined constant value, such that when said perpendicular distance exceeds said predetermined constant value, said one of said image structuring points is defined and stored as one of a plurality of temporary polygonal line structuring point data;

a step for polygonal line processing, including reading said temporary polygonal line structuring point data from said memory and selecting one of a plurality of second segments of said pixel line data defined by two of said temporary polygonal line structuring point data as second segment end points, extracting from said second segment a plurality of temporary polygonal line structuring points apart from said second segment end points, counting a number of image structuring points in said second segment such that if said number is greater than or exceeds a predetermined number, sample coordinates of said image structuring points are extracted and their mean coordinate values determined to provide optimal straight line data by connecting said mean coordinate values in said second segment, and if said number of image structuring points in said second segment is less than said second predetermined constant value, connecting a straight line between said second segment end points to provide optimal straight line data; and storing said optimal straight line data as being representative of segmentally optimal straight lines;

reading said optimal straight line data from said memory means and extracting two of said segmentally optimal straight lines from said optimal straight line data to determine a point of intersection between said two segmentally optimal straight lines such that said intersection point is stored as one of a plurality of polygonal line structuring point data; and finishing said polygonal line structuring by connecting said optimal straight lines about said polygonal line structuring point data for each of said plurality of second segments.

* * * * *